United States Patent
Nishimura

[11] Patent Number: 5,818,927
[45] Date of Patent: Oct. 6, 1998

[54] CIRCUIT FOR CONTROLLING AN ON-HOOK VOLTAGE BY THE USE OF A BALANCED AMPLIFIER WITHOUT SUPPLYING A CONSTANT CURRENT TO THE BALANCED AMPLIFIER

[75] Inventor: Kouichi Nishimura, Tokyo, Japan

[73] Assignee: Nec Corporation, Tokyo, Japan

[21] Appl. No.: 714,386

[22] Filed: Sep. 16, 1996

[30] Foreign Application Priority Data

Sep. 22, 1995 [JP] Japan .................................. 7-269114

[51] Int. Cl.⁶ .................................................. H04M 1/00
[52] U.S. Cl. ........................... 379/403; 379/399; 379/395
[58] Field of Search .................................. 379/7, 35, 39, 379/377, 382, 387, 395, 399, 403

[56] References Cited

U.S. PATENT DOCUMENTS

| | | | |
|---|---|---|---|
| 3,688,129 | 8/1972 | Ishigaki et al. | 327/306 |
| 3,973,082 | 8/1976 | Van der Plaats | 379/387 |
| 4,254,305 | 3/1981 | Treiber | 379/324 |
| 4,600,811 | 7/1986 | Hayashi et al. | 379/345 |
| 4,723,280 | 2/1988 | Meier et al. | 379/413 |
| 4,727,578 | 2/1988 | Molnar | 379/164 |
| 4,760,595 | 7/1988 | Arai | 379/385 |
| 5,323,461 | 6/1994 | Rosenbaum et al. | 379/399 |
| 5,568,547 | 10/1996 | Nishimura | 379/382 |

*Primary Examiner*—Daniel S. Hunter
*Assistant Examiner*—Charles N. Appiah
*Attorney, Agent, or Firm*—Whitham, Curtis & Whitham

[57] ABSTRACT

In an on-hook voltage control circuit for controlling an on-hook voltage by the use of an balanced amplifier producing a first and a second output signal which are equal in amplitude to each other and inverted in polarity from each other, a first signal producing circuit uses only the first and the second output signals to produces a first input signal supplied to the balanced amplifier. A first processing circuit processes the first output signal into a first processed signal by the use of a first reference signal. A second processing circuit processes the first processed signal into a second processed signal with an attenuation of the first processed signal. By the use of the first output, the second output, and the second processed signals, a second signal producing circuit produces a second input signal supplied to the balanced amplifier. The balanced amplifier amplifies the first and the second input signals to produce the first and the second output signals.

10 Claims, 4 Drawing Sheets

CIRCUIT FOR CONTROLLING AN ON-HOOK VOLTAGE BY THE USE OF A BALANCED AMPLIFIER WITHOUT SUPPLYING A CONSTANT CURRENT TO THE BALANCED AMPLIFIER

BACKGROUND OF THE INVENTION

This invention relates to a subscriber circuit included in an exchange used for a communication system and, in particular, to an on-hook voltage control circuit for controlling an on-hook voltage known in the art.

Such an on-hook voltage control circuit has a first and a second terminal end which are generally called a tip and a ring terminal in the art, respectively. In the manner known in the art, the first and the second terminal ends are connected to a terminal unit or a subscriber unit through a subscriber path for carrying out communication with the terminal unit.

A recent technical development has brought about a communication system which is capable of carrying out the communication even when a handset is not lifted up in the terminal unit. In order to enable such a communication, it is necessary to make each of the first and the second terminal ends have a particular voltage which is generally called an on-hook voltage.

A conventional on-hook voltage control circuit controls the on-hook voltage by the use of a balanced amplifier known in the art. In the manner known in the art, the balanced amplifier releases a control of the on-hook voltage while the handset is lifted up.

In the manner which will later be discussed in conjunction with the drawing, the conventional on-hook voltage control circuit supplies a constant current to the balanced amplifier in addition to a reference voltage and others. This results in a complicated circuit structure which leads to an increase in cost or a difficulty in reducing the cost.

In this event, the constant current is supplied to the balanced amplifier without passing through a low-pass filter. Accordingly, a noise component is directly supplied to the first and the second terminal ends with being superposed on the constant current. This results in deterioration of a noise characteristic.

In addition, it is assumed that each of the constant current and the reference voltage have fluctuation which makes the balanced amplifier have operation which is confused. As a result, the on-hook voltage has an unfavourable variation.

SUMMARY OF THE INVENTION

It is therefore an object of this invention to provide an on-hook voltage control circuit for use in a subscriber circuit, which can control a on-hook voltage without supplying a constant current to a balanced amplifier.

It is another object of this invention to provide an on-hook voltage control circuit of the type described, which is capable of suppressing a noise in the on-hook voltage.

It is still another object of this invention to provide an on-hook voltage control circuit of the type described, in which the balanced amplifier can be readily controlled.

Other objects of this invention will become clear as the description proceeds.

According to an aspect of this invention, there is provided an on-hook voltage control circuit for use in a subscriber circuit and for controlling an on-hook voltage supplied to a subscriber path which is connected to said subscriber circuit. The on-hook voltage control circuit comprises a balanced amplifier for amplifying a first and a second input signals to produce a first and a second output signal which are equal in amplitude to each other and inverted in polarity from each other and control means for controlling the first and the second input signals to make the balanced amplifier be in a active state. In the on-hook voltage control circuit, the control means comprises first signal producing means connected to the balanced amplifier for producing the first input signal only by the use of the first and the second output signals, first processing means connected to the balanced amplifier for processing the first output signal into a first processed signal by the use of a first reference signal, second processing means connected to the first processing means for processing the first processed signal into a second processed signal with an attenuation of the first processed signal, and second signal producing means connected to the second processing means and the balanced amplifier for producing the second input signal by the use of the first output signal, the second output signal, and the second processed signal.

According to another aspect of this invention, there is provided an on-hook voltage control circuit for use in a subscriber circuit and for controlling an on-hook voltage supplied to a subscriber path having a first and a second path which are connected to said subscriber circuit. The on-hook voltage control circuit comprises a balanced amplifier for amplifying a first and a second input signals to produce a first and a second output signal which are equal in amplitude to each other and inverted in polarity from each other and control means for controlling the first and the second input signals to make the balanced amplifier be in a active state. The balanced amplifier has a non-inverted input terminal, an inverted input terminal, a non-inverted output terminal, and an inverted output terminal. The non-inverted and the inverted input terminals are supplied with the first and the second input signals, respectively. The inverted and the non-inverted output terminals supply the first and the second output signals to the first and the second paths, respectively. In the on-hook voltage control circuit, the control means comprises a first resistor connected between the first path and the inverted input terminal, a second resistor connected between the second path and the non-inverted input terminal, a third resistor connected between the non-inverted output terminal and the inverted input terminal, and a fourth resistor connected between the inverted output terminal and the non-inverted input terminal. Each of the first through the fourth resistors has a predetermined resistance. The control means further comprises a fifth resistor connected between the inverted output terminal and the first path, a sixth resistor connected between the non-inverted output terminal and the second path, an adder connected to the inverted output terminal for carrying out addition between the first output signal and a first reference signal in voltage thereof to produce a first processed signal, a variable attenuator connected to the adder for attenuating the first produced signal into a second processed signal, a low-pass filter connected to the variable attenuator for processing the second processed signal into a filtered signal, and a voltage-current converter connected to the low-pass filter and the inverted input terminal for converting the filtered signal into an electric current which is supplied to the inverted input terminal.

According to still another object of this invention, there is provided an on-hook voltage control circuit for use in a subscriber circuit and for controlling an on-hook voltage supplied to a subscriber path having a first and a second path which are connected to said subscriber circuit. The on-hook voltage control circuit comprises a balanced amplifier for amplifying a first and a second input signals to produce a first and a second output signal which are equal in amplitude to each other and inverted in polarity from each other and control means for controlling the first and the second input signals to make the balanced amplifier be in a active state. The balanced amplifier having having a non-inverted input terminal, an inverted input terminal, a non-inverted output terminal, and an inverted output terminal. The non-inverted and the inverted input terminals are supplied with the first and the second input signals, respectively. The inverted and the non-inverted output terminals supply the first and the second output signals to the second and the first paths, respectively. In the on-hook voltage control circuit, the control means comprises a first resistor connected between the first path and the inverted input terminal, a second resistor connected between the second path and the non-inverted input terminal, a third resistor connected between the non-inverted output terminal and the inverted input terminal, and a fourth resistor connected between the inverted output terminal and the non-inverted input terminal. Each of the first through the fourth resistors has a predetermined resistance. The control means further comprises a fifth resistor connected between the inverted output terminal and the first path, a sixth resistor connected between the non-inverted output terminal and the second path, a level shifter connected to the inverted output terminal and having an attenuating function for level-shifting the second output signal with an attenuation by the attenuating function to produce a level-shifted signal, and an adder connected to the level shifter for carrying out addition among the level-shifted signal and a first and a second reference signal in voltage thereof to produce a first processed signal. The second reference signal is attenuated from the first reference signal with the attenuation. The control means further comprises a variable attenuator connected to the adder for attenuating the first produced signal with reference to the second reference signal into an attenuated signal, a subtractor connected to the variable attenuator for subtracting the second reference signal from the attenuated signal to produce a second processed signal, a low-pass filter connected to the subtractor for processing the second processed signal into a filtered signal, and a voltage-current converter connected to the low-pass filter and the inverted input terminal for converting the filtered signal into an electric current which is supplied to the inverted input terminal.

DESCRIPTION OF THE PREFERRED EMBODIMENTS

Figure 1:
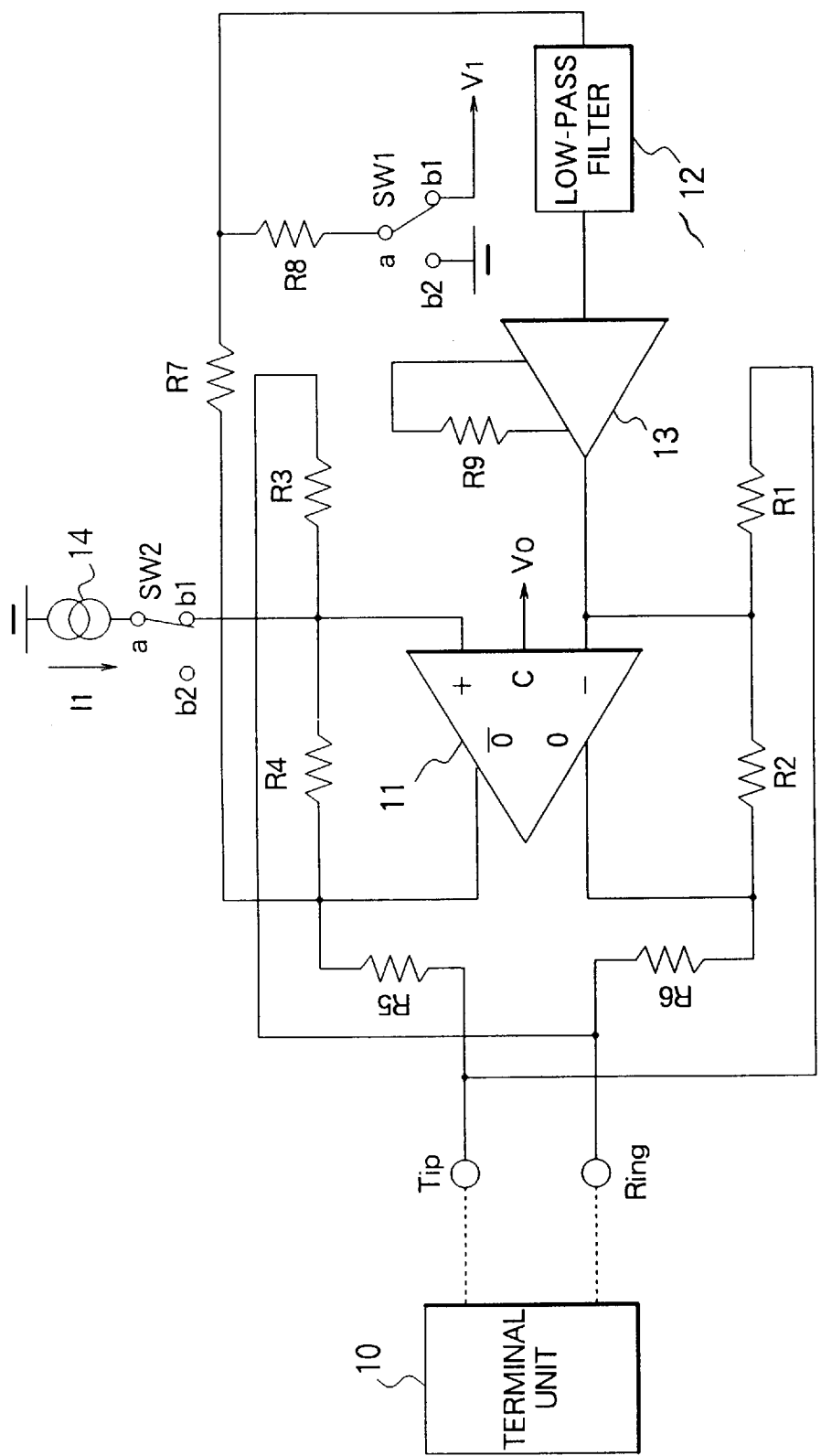
FIG. 1 shows, together with a terminal unit, a block diagram of a conventional on-hook voltage control circuit in a condition where a handset is not lifted up by a user.

Referring to FIG. 1, description will be made at first as regards a conventional on-hook voltage control circuit for a better understanding of this invention. The on-hook voltage control circuit is for use in a subscriber circuit and for controlling an on-hook voltage known in the art. The on-hook voltage control circuit has first and second terminal ends Tip and Ring which are connected to a terminal unit 10 through a first and a second path for carrying out communication with the terminal unit 10. A combination of the first and second paths will be called a subscriber path or a two-wire path.

The on-hook voltage control circuit comprises a balanced amplifier 11 of a differential-input differential-output type. The balanced amplifier 11 has positive and negative input terminals + and −, and non-inverted and inverted output terminals O and $\overline{O}$ (the symbol "−" representing an inversion in polarity). The positive and negative input terminals + and − are supplied with a first and a second input signal which are collectively operable as an input voltage. The balanced amplifier 11 is for amplifying the input voltage between the positive and the negative input terminals + and − to produce output voltages equal in amplitude to each other and inverted in polarity from each other with respect to a zeroth reference voltage V0 as a center voltage. The output voltages are outputted as a first output signal from the inverted output terminal $\overline{O}$ and as a second output signal from the the non-inverted output terminals O, respectively.

The first terminal end Tip is connected through a first resistor R1 to the inverted input terminal—of the balanced amplifier 11 and through the first resistor R1 and a second resistor R2 to the non-inverted output terminal O of the balanced amplifier 11 to form a feedback loop. The second terminal end Ring is connected through a third resistor R3 to the non-inverted input terminal + of the balanced amplifier 11 and through the third resistor R3 and a fourth resistor R4 to the inverted output terminal $\overline{O}$ of the balanced amplifier 11 to form another feedback loop. The inverted and the non-inverted output terminals $\overline{O}$ and O are connected through fifth and sixth resistors R5 and R6 to the first and the second terminal ends Tip and Ring, respectively. Thus, a combination of the balanced amplifier 11 and the first through the sixth resistors R1 through R6 serves as a unit inversion amplifier.

The on-hook voltage control circuit further comprises first and second switches SW1 and SW2 which are simultaneously operated in response to whether or not the terminal unit 10 is in an on-hook condition. Each of the first and the second switches SW1 and SW2 has a common terminal a, a make contact terminal b1, and a break contact terminal b2. The inverted output terminal $\overline{O}$ of the balanced amplifier 11 is also connected to the common terminal a of the first switch SW1 through seventh and eighth resistors R7 and R8 which are connected in series.

In the first switch SW1, the make contact terminal b1 is supplied with a first reference voltage V1. The break contact terminal b2 is supplied with a ground potential. The second switch SW2 will later be described.

The seventh and the eighth resistors R7 and R8 are connected to a point which is connected to a low-pass filter 12. A voltage-current converting circuit 13 is connected between the low-pass filter 12 and the inverted input terminal—of the balanced amplifier 11. The low-pass filter 12 produces a filter output voltage which is supplied to the voltage-current converting circuit 13 as a converter input voltage. The voltage-current converting circuit 13 converts the converter input voltage into the converter output current by the use of a ninth resistor R9 having a resistance R. The converter output current is supplied to the inverted input terminal—of the balanced amplifier 11.

A conversion factor Gm representing the rate of conversion from the converter input voltage into the converter output current is given by:

$$Gm = 1/R. \tag{1}$$

Herein, the zeroth reference voltage V0 is selected to be equal to a half of the second input signal that is supplied to the balanced amplifier 11.

Furthermore, the non-inverted input terminal + of the balanced amplifier 11 is connected to a constant current supplying circuit 14 through the second switch SW2. It is herein supposed that, in the on-hook condition, the common terminal a of each of the first and the second switches SW1 and SW2 is connected to the make contact terminal b1 and that, in an off-hook condition where the handset is lifted up by the user in the terminal unit 10, the common terminal a of each of the first and the second switches SW1 and SW2 is connected to the break contact terminal b2. In the on-hook condition, the balanced amplifier 11 supplies a constant current I1 through the second switch SW2 to the non-inverted input terminal + of the balanced amplifier 11.

Next, calculation is made of voltages of the first and the second terminal ends Tip and Ring in the on-hook condition.

No load is connected between the first and the second terminal ends Tip and the Ring. Each of the first through the fourth resistors R1 through R4 has a resistance which is relatively large as several hundreds of kiloohms and will be presented by R in the following. In this situation, substantially no current flows through the fifth and the sixth resistors R5 and R6. Accordingly, the first terminal end Tip and the inverted output terminal $\bar{O}$ of the balanced amplifier 11 are kept to have a particular potential. The second terminal end Ring and the non-inverted output terminal O of the balanced amplifier 11 are kept to have a specific potential.

As described above, the balanced amplifier 11 selects the zeroth reference voltage V0 equal to a half of a voltage of a negative source. Accordingly, the voltage between the ground and the inverted output terminal $\bar{O}$ of the balanced amplifier 11 is equal to the voltage between the negative source and the non-inverted output terminal O of the balanced amplifier 11.

Thus, the voltage between the ground and the first terminal end Tip is equal to the voltage between the negative source and the second terminal end Ring. Let those voltages be represented by V0 and will hereafter be referred to as the Tip and the Ring terminal voltages.

Focusing the output terminals of the balanced amplifier 11, the following equation holds:

$$V0 = V0 - \left\{ \frac{R8}{R7 + R8} \right\} (V0 - V1) + V1 + I1R, \tag{2}$$

where R7 and R8 represent resistances of the seventh and the eighth resisters R7 and R8, respectively.

$$I1R = \frac{R8}{R7 + R8} (V0 - V1) - V1. \tag{3}$$

In order to control the Tip and the Ring terminal voltages V0 in the on-hook condition by the first reference voltage V1, it is assumed that:

$$V0 = V1. \tag{4}$$

In this event, Equation (3) is rewritten into:

$$I1R = V1. \tag{5}$$

Thus, the ratio between the seventh and the eighth resistors R7 and R8 is no longer related.

This means that the Tip and the Ring terminal voltages can be kept constant in the on-hook condition even if the ratio between the seventh and the eighth resistors R7 and R8 is changed.

The above-mentioned voltage control is carried out by the use of the first reference voltage V1 and the constant current I1. The relationship between the first reference voltage V1 and the constant current I1 is controlled to satisfy Equation (5). In this manner, the Tip and the Ring terminal voltages in the on-hook condition are controlled according to Equation (4).

By controlling the Tip and the Ring terminal voltages in the on-hook condition as described above, it is possible to prevent the output voltages of the balanced amplifier 11 from exceeding the operation range. This is an essential requirement for normal transmission and reception of various signals in the on-hook condition.

The conventional on-hook voltage control circuit requires the constant current I1 in addition to the first reference voltage V1 to control the on-hook voltage. This results in a complicated circuit structure which leads to an increase in cost or a difficulty in reducing the cost.

In the meanwhile, the constant current I1 does not pass through the low-pass filter 12. Accordingly, a noise component superposed on the constant current I1 is directly supplied to the first and the second terminal ends Tip and Ring. This results in deterioration of a noise characteristic.

In addition, under the influence of fluctuation of the two control signals in combination, fluctuation of the voltages of the first and the second terminal ends Tip and Ring is further increased.

Figure 2:
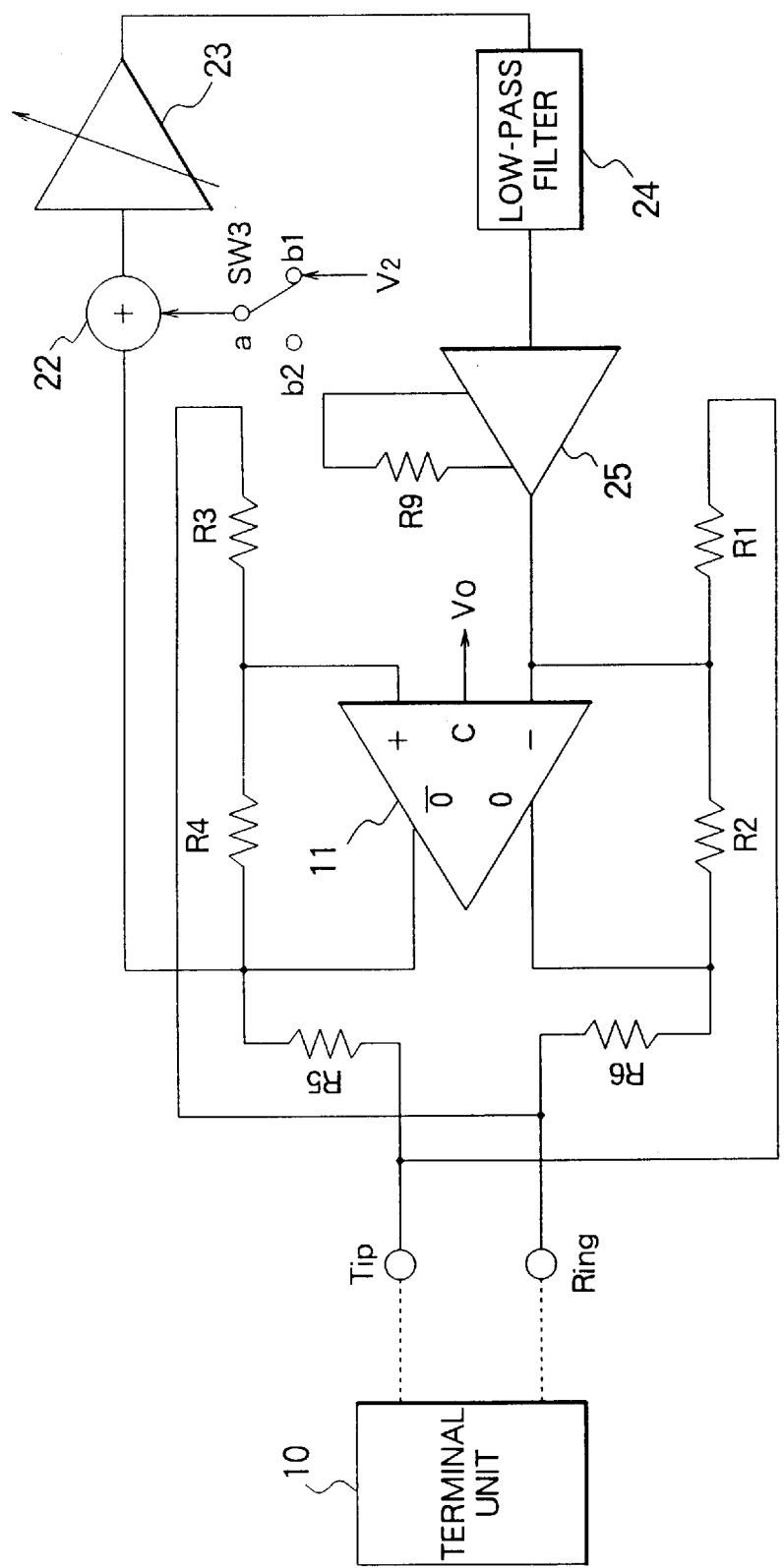
FIG. 2 shows, together with a terminal unit, a block diagram of a on-hook voltage control circuit according to a first embodiment of this invention.

Referring to FIG. 2, the description will be made as regards an on-hook voltage control circuit according to a first embodiment of this invention. The on-hook voltage control circuit comprises similar parts designated by like reference numerals. It is noted that the on-hook voltage control circuit does not comprises the constant current supplying circuit 14 that is described in conjunction with FIG. 1.

In the manner which will presently be described, the on-hook voltage control circuit comprises an adder 22, a variable attenuator 23, a low-pass filter 24, and a voltage-current converting circuit 25. The adder 22 is connected to the inverted output terminal $\bar{O}$ of the balanced amplifier 11 and is for calculating a sum voltage of the first output signal and a reference voltage V2 which will be referred to as a first reference voltage. The reference voltage V2 is selectively supplied to the adder 22 through a third switch SW3 which are simultaneously operated in response to whether or not the terminal unit 10 is in an on-hook condition. The third switch SW3 has a common terminal a, a first make contact terminal b1 supplied with the reference voltage V2, and a second make contact terminal b2 supplied with another voltage. As a result of calculation, the adder 22 produces an adder output signal or a first processed signal representative of the sum voltage.

The variable attenuator 23 is connected to the adder 22 and is for attenuating the adder output signal to produce an attenuator output signal or a second processed signal. The low-pass filter 24 is connected to the variable attenuator 23 and is for carrying out a predetermined low-pass filtering operation for the attenuator output signal to produce a filter output signal or a filtered signal represented by a voltage.

The voltage-current converting circuit 25 is connected to the low-pass filter 24 and is for converting the voltage of the filter output signal into a converter output current or an electric current. More particularly, the voltage-current converting circuit 25 converts the voltage of the filter output signal into the converter output current by the use of the ninth resistor R9 having a resistance which is represented by R9 in the following. A conversion factor Gm is give n by K3/R9. Herein, K3 is a constant. The converter output current is represented by I and is given by:

$$I = K3V/R9, \qquad (6)$$

where V represents the voltage of the filter output signal.

The converter output current is supplied to the inverted input terminal—of the balanced amplifier 11.

In the on-hook voltage control circuit of FIG. 2, calculation is made of the Tip and the Ring terminal voltages in the on-hook condition. The calculation is basically similar to that described in conjunction with the the on-hook voltage control circuit of FIG. 1. Accordingly, the description of the similar steps is omitted.

The balanced amplifier 11 detects a half of the voltage between the non-inverted and the inverted output terminals O and $\overline{O}$ of the balanced amplifier 11 to form an in-phase feedback loop. Accordingly, the voltage between the ground and the first terminal end Tip is equal to the voltage between the negative source and the second terminal end Ring of the balanced amplifier 11. These voltages are represented by V0 and will also be referred to as Tip and Ring terminal voltages.

Let the attenuation factor of the variable attenuator 23 be represented by K2. Focusing the output terminals of the balanced amplifier 11:

$$V0 = V0 - K2K3(V0+V2). \qquad (7)$$

Solving Equation (7) for V0:

$$V0 = -V2. \qquad (8)$$

Thus, K2 and K3 are no longer related.

This means that, even if the feed resistance in the off-hook condition is varied by controlling K2 and K3, an on-hook voltage is kept constant as far as the reference voltage V2 is fixed.

In FIG. 2, a combination of the third, the fourth, and the sixth resistors R3, R4, R6 is referred to as a first signal producing arrangement. The adder 22 is referred to as a first processing arrangement. The variable attenuator 23 is referred to as a second processing arrangement. A combination of the low-pass filter 24, the voltage-current converting circuit 25, the first resistor R1, the second resistor R2, and the fifth resistor R5 is referred to as a second signal producing arrangement.

Next referring to FIG. 3, the description will be made as regards an on-hook voltage control circuit according to a second embodiment of this invention. Similar part are designated by like reference numerals and will not be described any longer.

In the manner which will presently be described, the on-hook voltage control circuit comprises a level shifter 31, an adder 32, a variable attenuator 33, and a subtractor 34. The level shifter 31 is connected to the inverted out put terminal $\overline{O}$ of the balanced amplifier 11 and having an attenuating function for level-shifting the second output signal with an attenuation by the attenuating function to produce a level-shifted signal. In other words, the level shifter 31 has an attenuation function and detects the voltage at the inverted output terminal $\overline{O}$ of the balanced amplifier 11 and shifts the voltage within the range of, for example, 5V of a single power source. Specifically, the level shifter 31 inverts the polarity of the voltage with respect to the ground potential as a reference and attenuates the voltage at an attenuation factor K1.

The adder 32 is connected to the level shifter 31 and is for carrying out addition among the level-shifted signal, the reference signal V2, and a reference signal V3 in voltage thereof to produce an adder output signal or a first processed signal representative of a sum of the voltages. The reference signals V2 and V3 are referred to as a first and a second reference voltages, respectively.

The variable attenuator 33 is connected to the adder and for attenuating the adder output signal at a predetermined attenuation factor K2 with reference to the reference signal V3 into an attenuated signal. The subtractor 34 is connected to the variable attenuator 33 and for subtracting the reference signal V3 from the attenuated signal to produce a subtraction result signal or a second processed signal which is supplied to the low-pass filter 24.

The low-pass filter 24 carries out the predetermined low-pass filtering operation for the second processed signal to produce the filter output signal. When supplied with the filter output signal as a converter input voltage, the voltage-current converter 25 converts the converter input voltage into the converter output current by the use of the ninth resistor R9 having the resistance R. Like the on-hook voltage control circuit shown in FIG. 2, the conversion factor Gm is given by K3/R. In the on-hook voltage control circuit also, the relationship represented by Equation (6) holds.

The converter output voltage is supplied as a second input signal to the inverted input terminal of the balanced amplifier 11. The on-hook voltage control circuit aims to control the Tip and the Ring terminal voltages in the on-hook condition by the use of a low-voltage circuit. For this purpose, the first output signal outputted from the inverted output terminal $\overline{O}$ of the balanced amplifier 11 is detected and shifted in level to fall within the range of +5V.

By the use of the reference voltage V2 added at the adder 32, the Tip and the Ring terminal voltages are controlled in the on-hook condition. By simultaneous addition of the reference voltage V3, it is assured that, for the adder 32 and the variable attenuator 33, the input a.c. signal is kept within an operation range.

In order to remove an influence of the reference voltage V3 added at the adder 32, the subtractor 34 subtracts the reference voltage equivalent to V3 to recover an original signal level. Accordingly, calculation corresponding to Equation (7) is given by:

$$V0 = V0 - \{K2(K1V0 + K1V2) + V3 - V3\}. \qquad (9)$$

Herein, the attenuation factor K2 of the variable attenuator 33 is not multiplied on the reference voltage V3 added at the adder 32. This is because the variable attenuator 33 operates with respect to the reference voltage V3 as a reference. From Equation (9):

$$V0 = -V2. \qquad (10)$$

Thus, the result is identical with Equation (8).

It will be understood from Equation (10) that V0 is no longer related to K2 and that V0 is kept constant even if K2 is varied to control the feed resistance.

In the on-hook voltage control circuit also, it is possible to control the Tip and the Ring terminal voltages in the on-hook condition by merely controlling the reference voltage V2. The variable attenuator 33 is for determining an equivalent feed resistance in the subscriber circuit.

Figure 3:
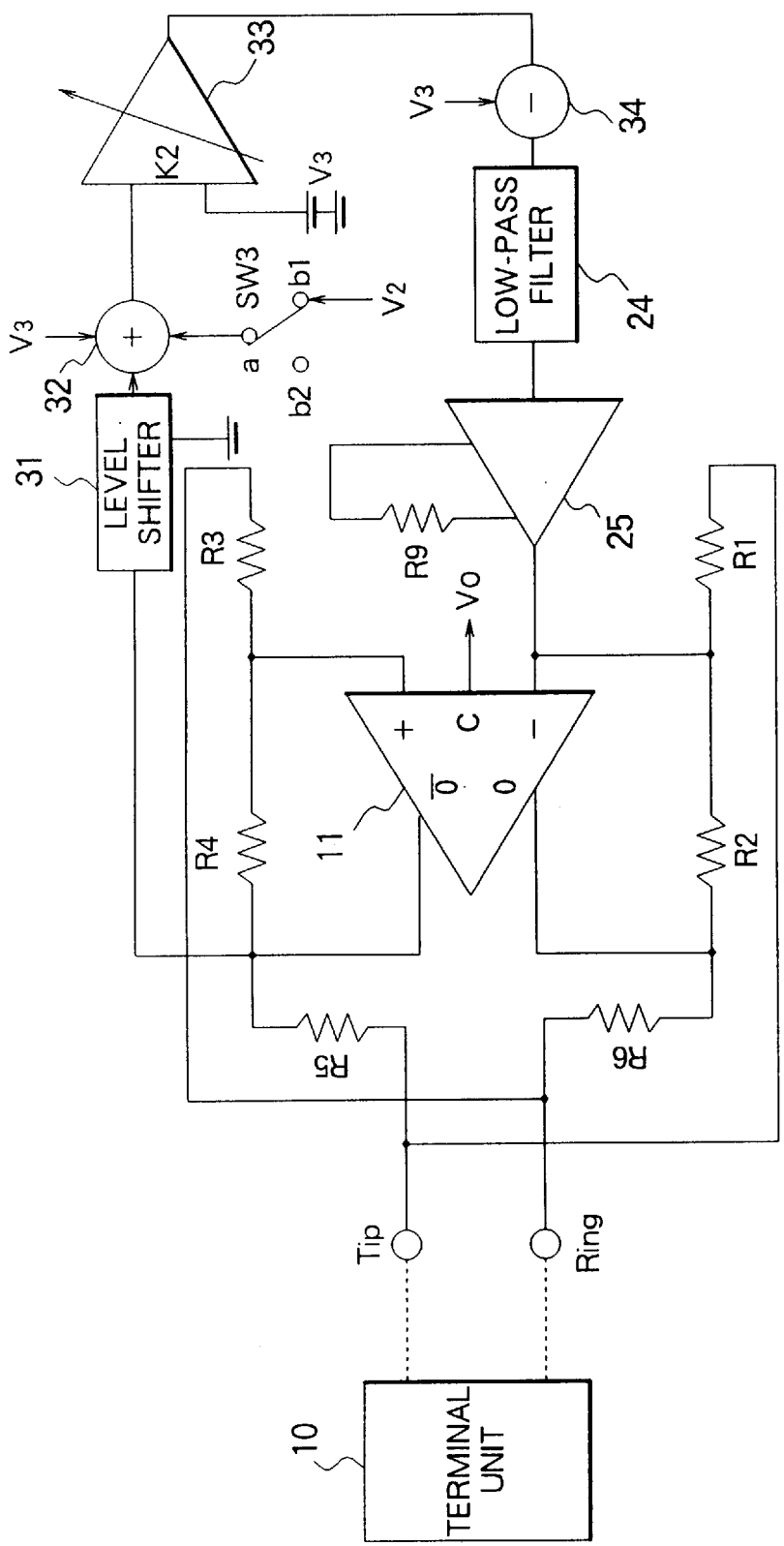
FIG. 3 shows, together with the terminal unit, a block diagram of a on-hook voltage control circuit according to a second embodiment of this invention.

In FIG. 3, a combination of the third, the fourth, and the sixth resistors R3, R4, R6 is referred to as the first signal producing arrangement. A combination of the level shifter 31 and the adder 32 is referred to as the first processing arrangement. A combination of the variable attenuator 33 and the subtractor 34 is referred to as the second processing arrangement. A combination of the low-pass filter 24, the voltage-current converting circuit 25, the first resistor R1, the second resistor R2, and the fifth resistor R5 is referred to as the second signal producing arrangement.

Figure 4:
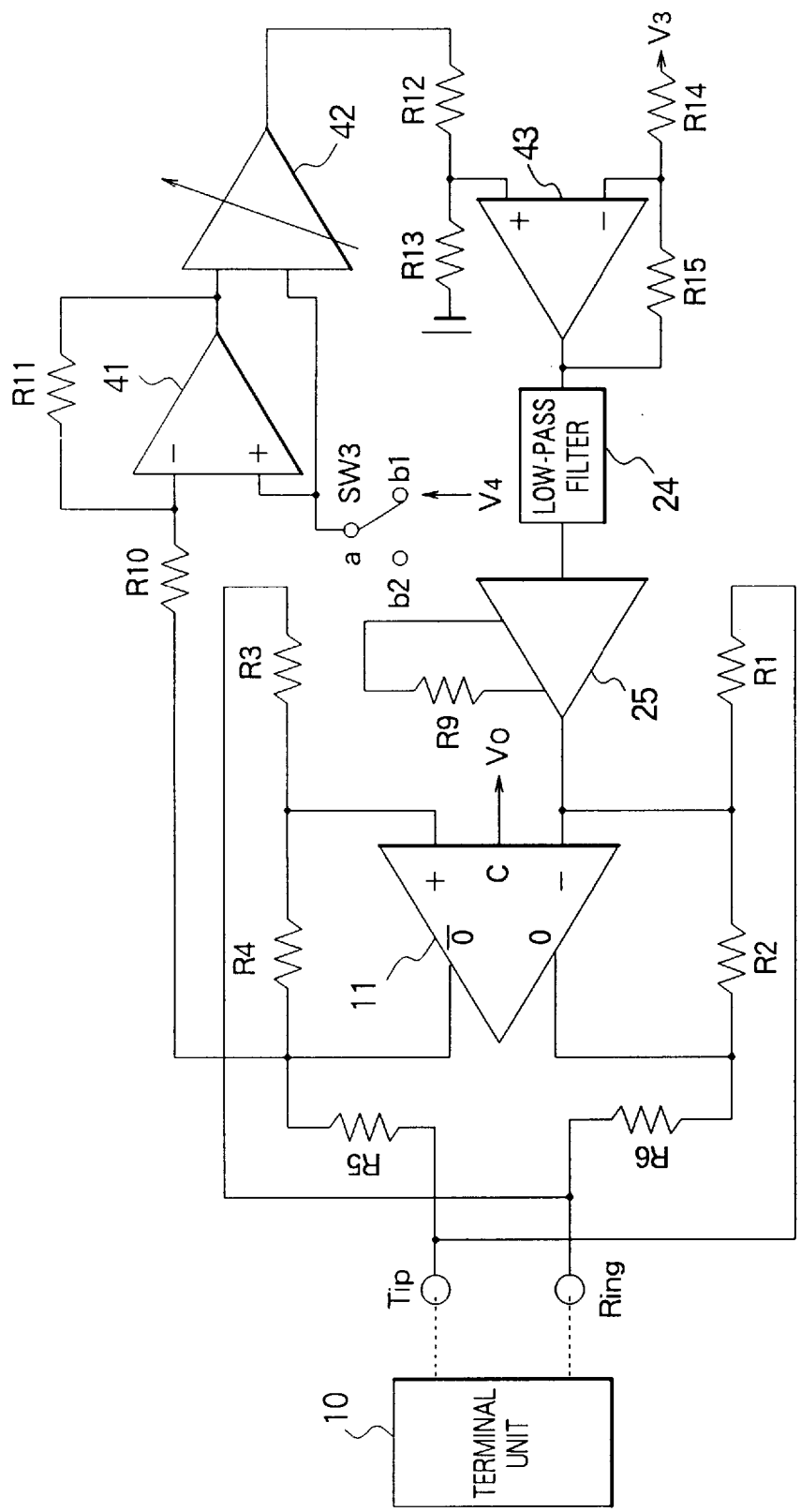
FIG. 4 shows, together with the terminal unit, a block diagram of a on-hook voltage control circuit according to a third embodiment of this invention.

Referring to FIG. 4, the description will be made as regards an on-hook voltage control circuit according to a third embodiment of this invention. Similar parts are designated by like reference numerals and will not be described any longer.

In the on-hook voltage control circuit, a combination of the level shifter 31 and the adder 32 in FIG. 3 are implemented by a tenth resistor R10, a first operational amplifier 41, and an eleventh resistor R11. The tenth resistor R10 is connected between the inverted output terminal $\overline{O}$ of the balanced amplifier 11. The operational amplifier 41 has a non-inverted input terminal, an inverted input terminal, and an output terminal. The inverted input terminal of the operational amplifier 41 is connected through the tenth resistor R10 to the inverted output terminal $\overline{O}$ of the balanced amplifier 11. The non-inverted input terminal is connected to a third switch SW3 which is simultaneously operated in response to whether or not the terminal unit 10 is in an on-hook condition. The third switch SW3 has a common terminal a, a first make contact terminal b1, and a second make contact terminal b2. Only when the common terminal a is connected to the first make contact terminal b1, a reference voltage V4 is supplied as the first reference signal or a third reference signal to the non-inverted input terminal of the operational amplifier 41. When the common terminal a is connected to the second make contact terminal b2, another voltage is supplied to the non-inverted input terminal of the operational amplifier 41. The eleventh resistor R11 is connected between the output terminal of the operational amplifier 41 and the inverted input terminal thereof. The reference voltage V4 is also supplied to the variable attenuator 42 through the third switch SW3 only when the terminal unit 10 is in an on-hook condition.

The subtractor 34 in FIG. 3 is implemented by a second operational amplifier 43, a twelfth resistor R12, a thirteenth resistor R13, a fourteenth resistor R14, and fifteenth resistor R15. The second operational amplifier 43 has a non-inverted input terminal, an inverted input terminal, and an output terminal. The non-inverted input terminal of the second operational amplifier 43 is connected to the variable attenuator 42 through the twelfth resistor R12 and to the ground through the thirteenth resistor R13. The inverted input terminal of the second operational amplifier 43 is connected to the fourteenth resistor R14 and is supplied with the voltage V2 through the fourteenth resistor R14. The fifteenth resistor R15 is connected between the output terminal of the second operational amplifier 43 and the inverted input terminal thereof.

Herein, calculation is carried out in the manner similar to the on-hook voltage control circuit of FIG. 3.

At first, calculation is made in connection with the first operational amplifier 41. As will be understood from FIG. 3, the first operational amplifier 41 is required to obtain an output voltage given by:

$$K1V0+K1V2+V3.$$

Let the output voltage of the first operational amplifier 41 be represented by V41. The tenth and the eleventh resistors R10 and R11 and the reference voltage V4 are selected so as to satisfy the following equation.

$$\begin{aligned}V41 &= V4 - R11(V0 - V4)/R10 \\ &= K1V0 + K1V2 + V3,\end{aligned} \quad (11)$$

where R10 and R11 represent resistances of the tenth and the eleventh resistors R10 and R11, respectively.

The result is equivalent to FIG. 3 if each value is selected to satisfy the following equations.

$$V4=(K1V2+V3)\{R10/(R10+R11)\} \quad (12)$$

$$K1=-R11/R10 \quad (13)$$

Next, calculation is made in connection with the second operational amplifier 43. The second operational amplifier 43 is required to carry out subtraction between the voltage V42 of the attenuator output signal and the reference voltage V3.

A combination of the second operational amplifier 43 and the twelfth through the fifth resistors R12 through R15 is referred to as a differential amplifier which serves as the subtractor. With the twelfth through fifth resistors R12 through R15 connected in the manner described above and satisfying the condition given by:

$$R12=R13=R14=R15, \quad (14)$$

the output voltage V43 of the second operational amplifier 43 is obtained by:

$$V43=V42-V3, \quad (15)$$

where R12 through R15 represent voltages of the twelfth through the fifth resistors R12 to R15, respectively. Thus, a desired characteristic is achieved.

By selecting each constant as described above, the on-hook voltage control circuit illustrated in FIG. 4 is equivalent to that in FIG. 3. Like in FIG. 3, the Tip and the Ring terminal voltages V0 in the on-hook condition in FIG. 4 are given by:

$$V0=-V2. \quad (16)$$

Thus, by changing the second reference voltage V2, the Tip and the Ring terminal voltages in the on-hook condition are obtained at a desired level.

In FIG. 4, a combination of the third, the fourth, and the sixth resistors R3, R4, R6 is referred to as the first signal producing arrangement. A combination of the first operational amplifier 41, the tenth resistor R10, and the eleventh resistor R11 is referred to as the first processing arrangement. A combination of the variable attenuator 42, a second operational amplifier 43, and the twelfth through the fifteenth resistors R12 to R15 is referred to as the second processing arrangement. A combination of the low-pass filter 24, the voltage-current converting circuit 25, the first resistor R1, the second resistor R2, and the fifth resistor R5 is referred to as the second signal producing arrangement.

As described above, control of the Tip and the Ring terminal voltages in the on-hook condition is collectively carried out in the stage preceding the low-pass filter. It is therefore possible to remarkably improve the noise characteristic.

What is claimed is:

1. An on-hook voltage control circuit for use in a subscriber circuit and for controlling an on-hook voltage supplied to a subscriber path which is connected to said subscriber circuit, said on-hook voltage control circuit comprising a balanced amplifier for amplifying a first and a second input signals to produce a first and a second output signal which are equal in amplitude to each other and inverted in polarity from each other, and control means for controlling said first and said second input signals to make said balanced amplifier be in a active state, said control means comprising:

first signal producing means connected to said balanced amplifier for producing said first input signal only by the use of said first and said second output signals;

first processing means connected to said balanced amplifier for processing said first output signal into a first processed signal by the use of a first reference signal;

second processing means connected to said first processing means for processing said first processed signal into a second processed signal with an attenuation of said first processed signal; and second signal producing means connected to said second processing means and said balanced amplifier for producing said second input signal by the use of said first output signal, said second output signal, and said second processed signal.

2. An on-hook voltage control circuit as claimed in claim 1, wherein said first processing means comprises an adder which is connected to said balanced amplifier and is for adding said first reference signal to said first output signal to produce said first processed signal.

3. An on-hook voltage control circuit for use in a subscriber circuit and for controlling an on-hook voltage supplied to a subscriber path which is connected to said subscriber circuit, said on-hook voltage control circuit comprising a balanced amplifier for amplifying a first and a second input signals to produce a first and a second output signal which are equal in amplitude to each other and inverted in polarity from each other, and control means for controlling said first and said second input signals to make said balanced amplifier be in a active state, said control means comprising:

first signal producing means connected to said balanced amplifier for producing said first input signal only by the use of said first and said second output signals;

first processing means connected to said balanced amplifier for processing said first output signal into a first processed signal by the use of a first reference signal;

second processing means connected to said first processing means for processing said first processed signal into a second processed signal with an attenuation of said first processed signal; and second signal producing means connected to said second processing means and said balanced amplifier for producing said second input signal by the use of said first output signal, said second output signal, and said second processed signal, wherein said first processing means comprises an adder which is connected to said balanced amplifier and is for adding said first reference signal to said first output signal to produce said first processed signal, and wherein said second processing means comprises an attenuator which is connected to said adder and said second signal producing means and is for attenuating said first processed signal into said second processed signal.

4. An on-hook voltage control circuit for use in a subscriber circuit and for controlling an on-hook voltage supplied to a subscriber path which is connected to said subscriber circuit, said on-hook voltage control circuit comprising a balanced amplifier for amplifying a first and a second input signals to produce a first and a second output signal which are equal in amplitude to each other and inverted in polarity from each other, and control means for controlling said first and said second input signals to make said balanced amplifier be in a active state, said control means comprising:

first signal producing means connected to said balanced amplifier for producing said first input signal only by the use of said first and said second output signals;

first processing means connected to said balanced amplifier for processing said first output signal into a first processed signal by the use of a first reference signal;

second processing means connected to said first processing means for processing said first processed signal into a second processed signal with an attenuation of said first processed signal; and second signal producing means connected to said second processing means and said balanced amplifier for producing said second input signal by the use of said first output signal, said second output signal, and said second processed signal, wherein said first processing means comprises:
  level-shifting means connected to said balanced amplifier for shifting a level of said first output signal to produce a level-shifted signal; and
  an adder connected to said level-shifting means for adding said first reference signal and a second reference signal to said level-shifted signal to produce said first processed signal.

5. An on-hook voltage control circuit as claimed in claim 4, wherein said second processing means comprises:
  an attenuator connected to said adder for attenuating said first processed signal with reference to said second reference signal into an attenuated signal; and
  a subtractor connected to said attenuator and said second signal processing means for subtracting said second reference signal from said attenuated signal to produce said second processed signal.

6. An on-hook voltage control circuit for use in a subscriber circuit and for controlling an on-hook voltage supplied to a subscriber path having a first and a second path which are connected to said subscriber circuit, said on-hook voltage control circuit comprising a balanced amplifier for amplifying a first and a second input signals to produce a first and a second output signal which are equal in amplitude to each other and inverted in polarity from each other and control means for controlling said first and said second input signals to make said balanced amplifier be in a active state, said balanced amplifier having a non-inverted input terminal, an inverted input terminal, a non-inverted output terminal, and an inverted output terminal, said non-inverted and said inverted input terminals being supplied with said first and said second input signals, respectively, said inverted and said non-inverted output terminals supplying said first and said second output signals to said first and said second paths, respectively, said control means comprising:

a first resistor connected between said first path and said inverted input terminal;

a second resistor connected between said second path and said non-inverted input terminal;

a third resistor connected between said non-inverted output terminal and said inverted input terminal;

a fourth resistor connected between said inverted output terminal and said non-inverted input terminal, each of said first through said fourth resistors having a predetermined resistance;

a fifth resistor connected between said inverted output terminal and said first path;

a sixth resistor connected between said non-inverted output terminal and said second path;

an adder connected to said inverted output terminal for carrying out addition between said first output signal and a first reference signal in voltage thereof to produce a first processed signal;

a variable attenuator connected to said adder for attenuating said first produced signal into a second processed signal;

a low-pass filter connected to said variable attenuator for processing said second processed signal into a filtered signal; and a voltage-current converter connected to said low-pass filter and said inverted input terminal for converting said filtered signal into an electric current which is supplied to said inverted input terminal.

7. An on-hook voltage control circuit for use in a subscriber circuit and for controlling an on-hook voltage supplied to a subscriber path having a first and a second path which are connected to said subscriber circuit, said on-hook voltage control circuit comprising a balanced amplifier for amplifying a first and a second input signals to produce a first and a second output signal which are equal in amplitude to each other and inverted in polarity from each other and control means for controlling said first and said second input signals to make said balanced amplifier be in a active state, said balanced amplifier having having a non-inverted input terminal, an inverted input terminal, a non-inverted output terminal, and an inverted output terminal, said non-inverted and said inverted input terminals being supplied with said first and said second input signals, respectively, said inverted and said non-inverted output terminals supplying said first and said second output signals to said second and said first paths, respectively, said control means comprising:

a first resistor connected between said first path and said inverted input terminal;

a second resistor connected between said second path and said non-inverted input terminal;

a third resistor connected between said non-inverted output terminal and said inverted input terminal;

a fourth resistor connected between said inverted output terminal and said non-inverted input terminal, each of said first through said fourth resistors having a predetermined resistance;

a fifth resistor connected between said inverted output terminal and said first path;

a sixth resistor connected between said non-inverted output terminal and said second path;

a level shifter connected to said inverted output terminal and having an attenuating function for level-shifting said second output signal with an attenuation by said attenuating function to produce a level-shifted signal;

an adder connected to said level shifter for carrying out addition among said level-shifted signal and a first and a second reference signal in voltage thereof to produce a first processed signal, said second reference signal being attenuated from said first reference signal with said attenuation;

a variable attenuator connected to said adder for attenuating said first produced signal with reference to said second reference signal into an attenuated signal;

a subtractor connected to said variable attenuator for subtracting said second reference signal from said attenuated signal to produce a second processed signal;

a low-pass filter connected to said subtractor for processing said second processed signal into a filtered signal; and a voltage-current converter connected to said low-pass filter and said inverted input terminal for converting said filtered signal into an electric current which is supplied to said inverted input terminal.

8. An on-hook voltage control circuit as claimed in claim 7, wherein a combination of said level shifter and said adder comprises:

a first operational amplifier having a non-inverted input terminal, an inverted input terminal, and an output terminal, said non-inverted input terminal of the first operational amplifier being supplied with a third reference signal, said output terminal of the first operational amplifier being connected to said variable attenuator;

a resistor connected between said inverted output terminal of the balanced amplifier and said inverted input terminal of the first operational amplifier; and a resistor connected between said inverted input terminal of the first operational amplifier and said output terminal of the first operational amplifier.

9. An on-hook voltage control circuit as claimed in claim 8, wherein said third reference signal is supplied as said second reference signal further to said variable attenuator.

10. An on-hook voltage control circuit as claimed in claim 7, wherein said subtractor comprises:

a second operational amplifier having a non-inverted input terminal, an inverted input terminal, and an output terminal;

a resistor connected between said variable attenuator and said non-inverted input terminal of the second operational amplifier;

a resistor connected between the ground and said non-inverted input terminal of the second operational amplifier;

a resistor connected to said inverted input terminal of the second operational amplifier, said second reference signal being supplied with said inverted input terminal of the second operational amplifier through the last-mentioned resistor; and a twelfth resistor connected between said said inverted input terminal of the second operational amplifier and said inverted input terminal of the second operational amplifier.

* * * * *